United States Patent [19]

Bauer et al.

[11] Patent Number: 5,745,888
[45] Date of Patent: Apr. 28, 1998

[54] ADVANCED FILE SERVER APPARATUS AND METHOD

[75] Inventors: Eric J. Bauer, Freehold; Elena Nesvetaeva, Matawan, both of N.J.

[73] Assignee: NCR Corporation, Dayton, Ohio

[21] Appl. No.: 901,381

[22] Filed: Jul. 28, 1997

Related U.S. Application Data

[63] Continuation of Ser. No. 549,499, Oct. 27, 1995, abandoned.

[51] Int. Cl.$^6$ .................................................. G06F 17/30
[52] U.S. Cl. ........................................ 707/1; 707/100
[58] Field of Search .............................. 395/616, 611, 395/427, 612, 706, 700, 500, 703, 601, 610

[56] References Cited

U.S. PATENT DOCUMENTS

| | | | |
|---|---|---|---|
| 4,875,159 | 10/1989 | Cary et al. | 364/200 |
| 5,226,163 | 7/1993 | Karsh et al. | 395/700 |
| 5,287,504 | 2/1994 | Carpenter et al. | 395/600 |
| 5,412,808 | 5/1995 | Bauer | 395/600 |
| 5,471,615 | 11/1995 | Amatsu et al. | 395/200.03 |
| 5,485,579 | 1/1996 | Hitz et al. | 395/200.12 |
| 5,555,388 | 9/1996 | Shaughnessy | 395/427 |
| 5,574,898 | 11/1996 | Leblang et al. | 395/601 |
| 5,611,066 | 3/1997 | Keele et al. | 395/427 |
| 5,617,568 | 4/1997 | Ault et al. | 395/612 |
| 5,627,996 | 5/1997 | Bauer | 395/500 |
| 5,649,200 | 7/1997 | Leblang et al. | 395/703 |
| 5,675,805 | 10/1997 | Boldo et al. | 395/706 |
| 5,678,042 | 10/1997 | Pisello et al. | 395/610 |

FOREIGN PATENT DOCUMENTS

| | | | |
|---|---|---|---|
| 0278315 | 8/1988 | European Pat. Off. | 9/46 |
| 63-59639 | of 1988 | Japan . | |

OTHER PUBLICATIONS

Bach, The Design of the Unix Operating System, Prentice-Hall, pp. 60–145.
Data Structure in Pascal, Reingold et al. pp. 376–383 Published by Little, Brown and Company, no date.
Database Systems, C.J. Date pp. 733–738 Published by Addison-Wesley Publishing Company, no date.
"Portable File Services," Burton Group Report; The Authority in Network Computing, by Craig Burton and Jamie Lewis, Mar. 1992.
MS-DOS File Name Generation; Microsoft Press, A Division of Microsoft Corporation, 1994.
The Design of the Unix Operating System, Prentice-Hall, Inc., Maurice J. Bach, no date.

*Primary Examiner*—Thomas G. Black
*Assistant Examiner*—Frantz Coby
*Attorney, Agent, or Firm*—Matthew J. Hodulik

[57] ABSTRACT

An apparatus and method for enabling users of a network which have computers running several different operating systems to easily access each others files. In order that files may be referenced and accessed by computers utilizing different operating systems, an algorithm is used to create legitimate, meaningful filenames by combining both a filename from a host computer's "native" name space and a unique "inode" number from the host computer's file system assigned for this file. The preliminary information necessary to apply the algorithm is able to be obtained rather easily, since the to host computer's filename and inode number are returned by a well-known UNIX operating system call "getdents(2)". Client computers whose operating systems do not support a particular filename would both see and access a particular file via special filename that is computed-on-the-fly, wherein this name is not actually stored on the host computer in either the file system or in a file, thereby eliminating a need for storing any additional information in the system. Using a unique file characteristic such as inode number for computing the mapping of a long filename, rather than the long filename alone, improves the uniqueness of resulting filenames, which is crucial if a client is dealing with large directories of files with similar names.

23 Claims, 4 Drawing Sheets

FIG. 1 PRIOR ART

ADVANCED FILE SERVER APPARATUS AND METHOD

This application is a continuation of application Ser. No. 08/549,499 filed Oct. 27, 1995, now abandoned.

FIELD OF THE INVENTION

The present invention relates to the field of computer systems, and more particularly to an apparatus and method adapted for the accessing of shared files within a computer system.

BACKGROUND OF THE INVENTION

Computer operating systems provide access to files stored within a computer system via "filenames", wherein the filenames generally must conform to specific naming rules. At a minimum, these naming rules specify permitted characters and a maximum number of characters in a filename. Additionally, some operating systems may mandate a specific filename format. For example, Microsoft's MS-DOS operating system permits filenames to contain only alphabetic characters (A–Z), numeric characters (0–9) and a few symbols (e.g., ".", "—", "-", etc.), while also mandating that filenames have a 1 to 8 character name with a 0 to 3 character extension, e.g., "AUTOEXEC.BAT". This is sometimes referred to as the "8.3" format. On the other end of the spectrum, AT&T's MP-RAS UNIX Operating System supports filenames of up to 255 characters, other than "/", the slash character.

In any event, because some operating systems are more restrictive than others, there is always a potential for giving a file a name which is valid for a less restrictive operating system, for example, Windows NT, which permits filenames to include any non-Null character and be up to 255 bytes long, while at the same time the filename is invalid on a more restrictive operating system like MS-DOS.

In network operating systems where computers running several different operating systems attempt to simultaneously access files, the different file naming constraints can become problematic. As an example, if a Windows NT client creates a file named "1995DepartmentBudget" on a shared file system, the MS-DOS client is incapable of accessing that file as named because that file does not meet MS-DOS's 8.3 filename format rules.

An obvious solution to this problem in such a shared file system network environment is to require computer users to create filenames that meet the least common denominator of filename rules. That is, the most restrictive rules must apply to each of the supported operating systems having shared files and directories, which are typically MS-DOS's 8.3 filename format rules.

A more sophisticated solution is to maintain a "namespace table" whereby each file has a name in each namespace. For example, the Windows NT file system (NTFS) maintains both a long filename of up to 255 bytes and an MS-DOS style 8.3 format filename for each file, as described in Inside The Windows NT File System, Helen Custer, Microsoft Press, 1994, ISBN-55615-660-X, pp. 69–72. Similarly, Novell's Portable NetWare maintains a file in user-level which supports additional namespaces for the OS/2 and Macintosh operating systems.

This solution is not satisfactory for a UNIX environment, however, because it requires keeping static records of MS-DOS-style filenames for every file on the system. If the possibility is considered of other file systems being remotely mounted on the UNIX machine with NFS (network File System), which can also be referenced to clients with more restrictive operating systems, the amount of information needed to be kept becomes unmanageable.

It is therefore an object of the present invention to provide a simpler method of enabling files to be shared among a network of computers running a variety of operating systems. It is further an object of the present invention to reduce and/or eliminate the keeping of multiple static filename records corresponding to various filenaming conventions of client operating systems in the network.

SUMMARY OF THE INVENTION

The present invention is an apparatus and method for enabling users of a network which have computers running several different operating systems to easily access each others files. In order that files may be referenced and accessed by computers utilizing different operating systems, an algorithm is used to create legitimate, meaningful filenames by combining both a filename from a host computer's "native" name space and a unique "inode" number, or some other unique file characteristic, from the host computer's file system assigned for this file. The preliminary information necessary to apply the algorithm is able to be obtained rather easily, since the host computer's filename and inode number are returned by a well-known UNIX operating system call "getdents(2)". Client computers whose operating systems do not support a particular filename would both see and access a particular file via special filename that is computed-on-the-fly, wherein this name is not actually stored on the host computer in either the file system or in a file, thereby eliminating a need for storing any additional information in the system. Using a unique file characteristic such as inode number for computing the mapping of a long filename, rather than the long filename alone, improves the uniqueness of resulting filenames, which is crucial if a client is dealing with large directories of files with similar names.

Consider a server computer running UNIX and a client computer running MS-DOS. A shared file named "longfilename" that has inode number 1234 reported by the getdents (2) operating system call. The "longfilename", as would be understood, is not a valid MS-DOS filename because it is not 8.3 format.

A simple algorithm is to eliminate any characters from the native filename that are invalid on the client operating system. This name is then truncated to a length and format required by the client operating system. Next several characters are appended or overwritten if necessary with characters hashed from the inode number for the particular file. A simple inode number hashing algorithm is to take a three digit decimal representation of the inode value modulus 1000 (decimal). Thus, for the file "longfilename" with inode number 1234, the name would be filtered and truncated to "longfile". The hashed inode number is then "234" wherein the last three characters of "longfile" ("ile") are overwritten to reach a computed name of "longf234".

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

The present invention is an apparatus and method for enabling users of a network which have computers running several different operating systems to easily access shared others files. Meaningful filenames are created by combining both a filename from a host computer's "native" name space and a unique "inode" number, or other unique file characteristic, from the host computer's file system assigned for this file.

Figure 1:
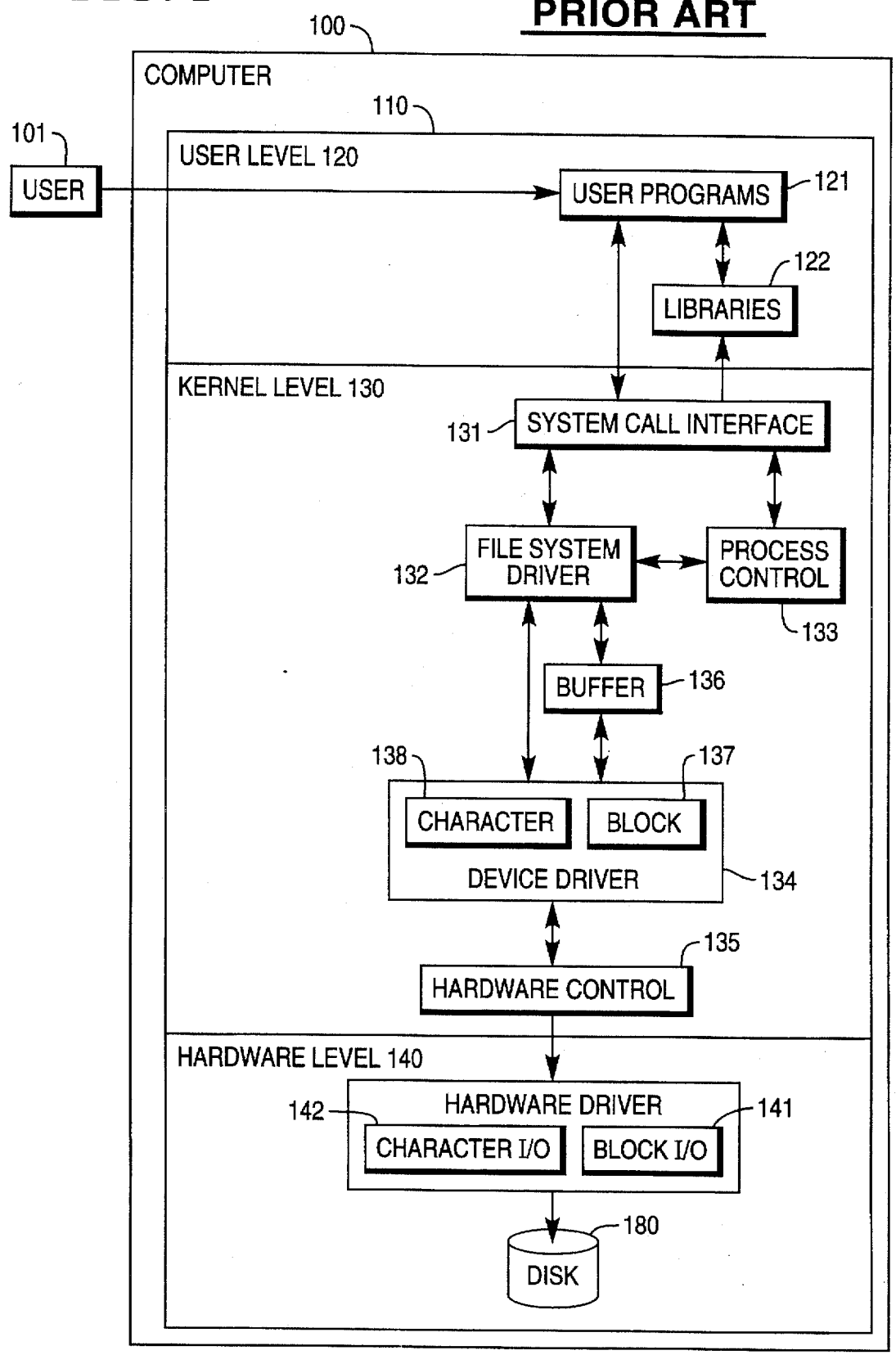
FIG. 1 illustrates a block diagram of a host computer and its operating system which is useful in describing the operation of the present invention.

FIG. 1 shows a block diagram of a computer and its operating system which is useful in describing the operation of the present invention. In the description, each, item or block of each figure has a reference designation associated therewith, the first number of which refers to the figure in which that item is first located (e.g.; 110 is located in FIG. 1 and step 501 is located in FIG. 5).

FIG. 1 depicts a computer system 100 which operates under control of a UNIX® operating system 110, shown using a high-level architecture layer diagram. The layer diagram includes a user level 120, a kernel level 130, and a hardware level 140. The user level 120 interfaces to a user 101 enabling access to the file system via the file system driver 132 to the physical file stored on disk 180.

The user level 120 includes the user programs 121 and libraries 122. AT&T's Advanced Server for UNIX systems is an example user program which provides networked computers access to files, printers and other resources hosted by a computer running the UNIX operating system. The hardware level 140 provides the operating system 110 with basic services needed by computer 100. The kernel level 130 interacts directly with the hardware level 140 providing common services to user 120 programs and insulating them from hardware idiosyncrasies. Viewing the system as a set of layers, the operating system is commonly called the system kernel 130, or just the kernel, emphasizing its isolation from user programs. Because user programs are independent of the underlying hardware, it is easy to move them between UNIX systems running on different hardware. The general description of the well known operation of a UNIX operating system is derived from Chapter 2 of the book entitled "The Design of the UNIX Operating System" by Maurice J. Bach.

The system call interface 131 represents the border between user level 120 (user programs 121 and program libraries 122) and the kernel level 130. System call interface converts user program function calls into UNIX operating system calls. Operating system calls look like ordinary function calls in C programs, and libraries map these function calls to the primitives needed to enter the operating system in a well-known manner. The set of operating system calls includes those that interact with the file system driver 132 and those that interact with the process control subsystems 133. The file system driver 132 manages files, allocating file space, controlling access to files, and retrieving data for users. Processes interact with the file system driver 132 via a specific set of system calls, such as open (to open a file for reading or writing), close, read, write, stat (query the attributes of a file), chown (change the record of who owns the file) and chmod (change the access permissions of a file). The file system driver 132 accesses file data using a buffer 136 that regulates data flow between the kernel and secondary storage 20 devices. The buffering mechanism interacts with block I/O device drivers 137 to initiate data transfer to and from the kernel. Device drivers 134 are the kernel modules that control the operation of peripheral devices. Block I/O devices 141 are random access storage devices; alternatively, their device drivers 137 make them appear to be random access storage devices to the rest of the system. For example, a tape driver may allow the kernel to treat a tape unit as a random access storage device. The file system also interacts directly with "raw" or character I/O device drivers 138 without the intervention of a buffering mechanism. Raw devices, sometimes called character I/O devices 142, include all devices that are not block devices.

The process control subsystem 133 is responsible for process synchronization, interprocess communication, memory management, and process scheduling. The file system driver 132 and the process control subsystem 133 interact when loading a file into memory for execution. The process control subsystem 133 reads executable files into memory before executing them.

Some of the system calls for controlling processes include the following: fork (creates a new process), exec (overlay the image of a program onto the running process), exit (finish executing a process), wait (synchronize process execution with the exit of a previously forked process), brk (control the size of memory allocated to a process), and signal (control process response to extraordinary events).

As previously noted, computer 100 enables the user to access files stored on disk 180. A "file" is best viewed as a logical information object which may include one or more data streams and which has an owner and permissions and other attributes, and one no or more filenames. A data stream is best viewed as an independent sequence of data bytes that can grow or shrink independent of any other data streams on the machine. Hence, the following are file operations: rename, link, change ownership, change group ownership, and change mode. The following are data stream operations: read, write, and lock (a portion of a data stream).

Figure 2:
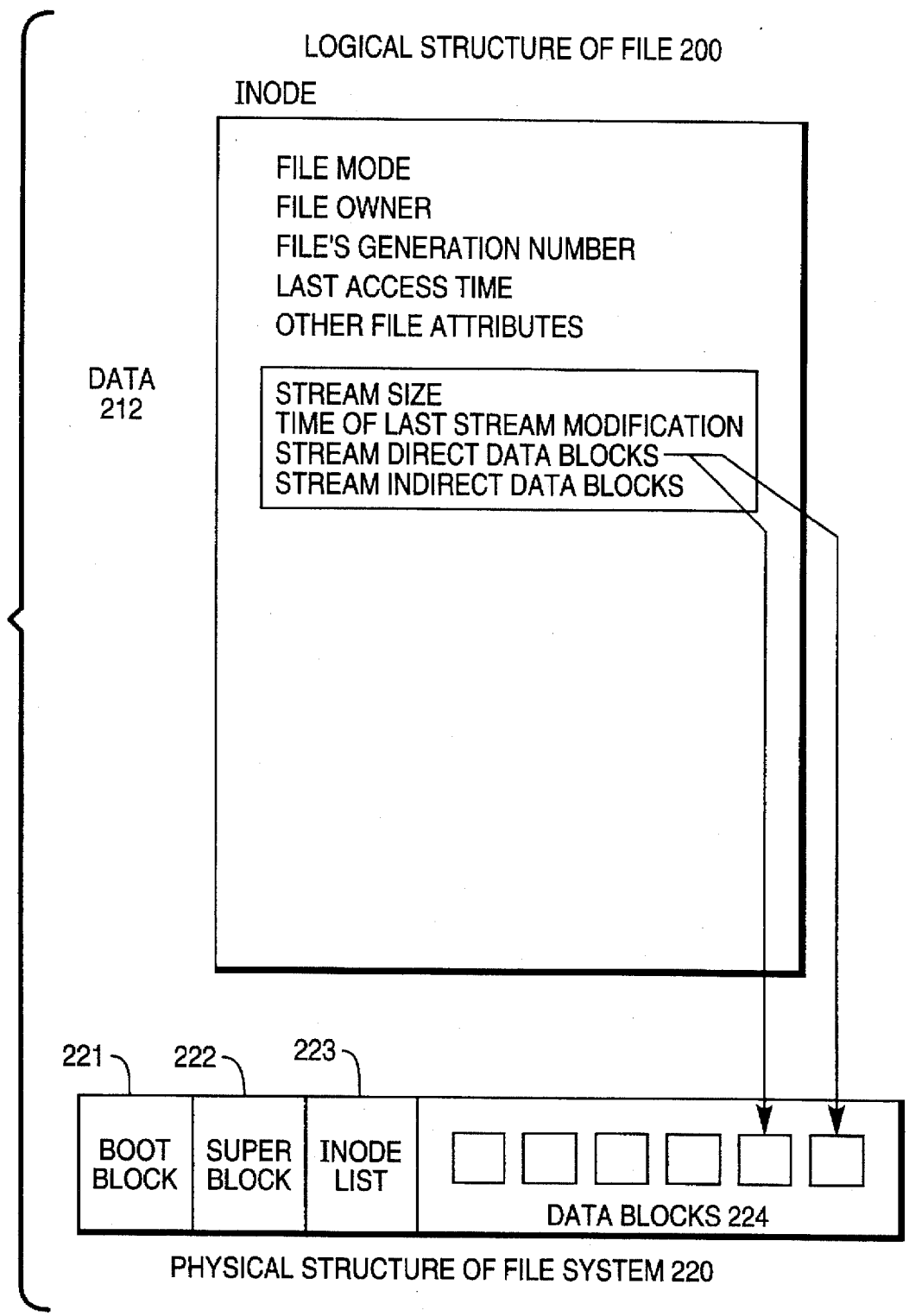
FIG. 2 shows the logical and physical structure of a file and a file system.
Figure 3:
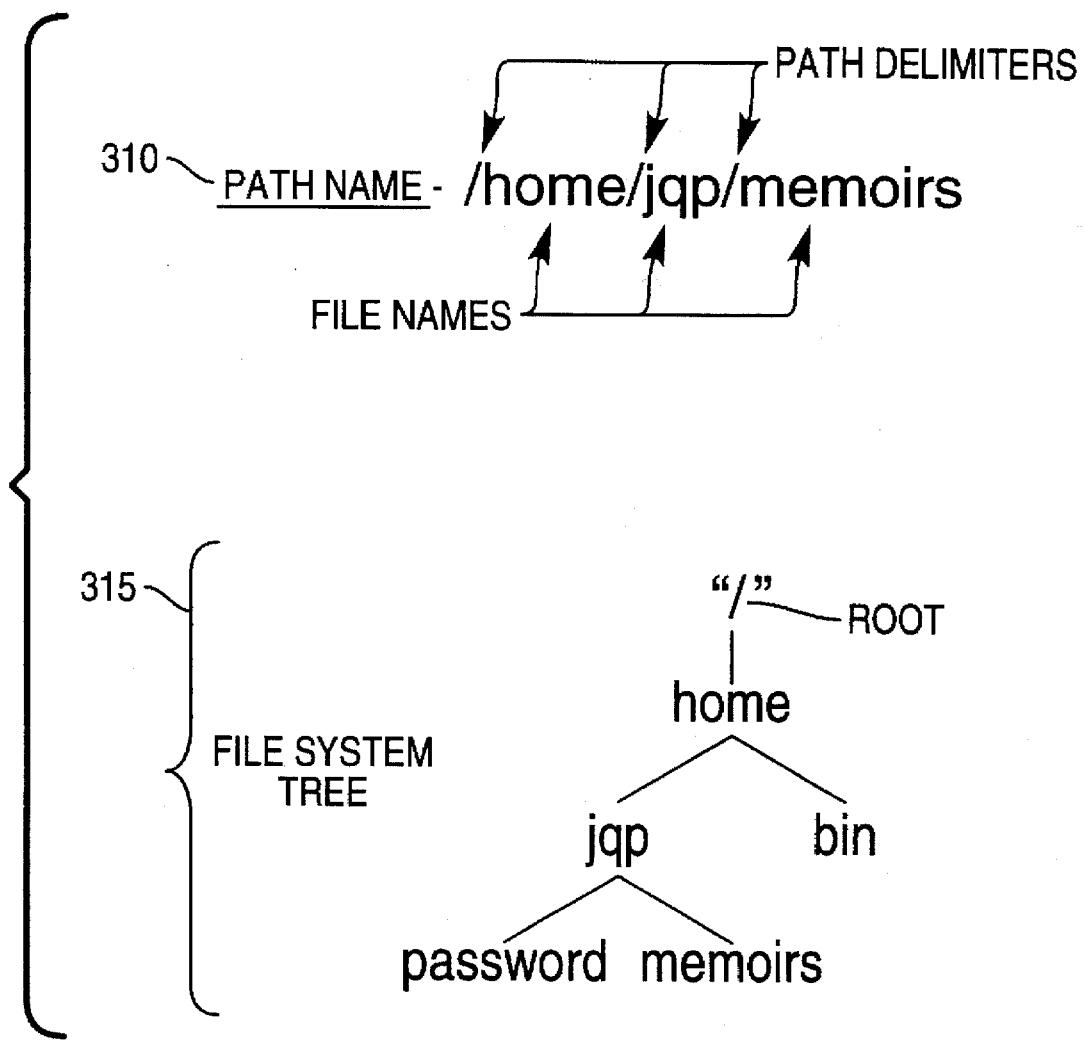
FIG. 3 shows and defines various terms useful in describing the present invention.

With joint reference to FIGS. 1, 2 and 3 we describe an overview of a file system. Every file is named by one or more pathnames, 310. A pathname, as shown in 310, includes filenames (e.g. home) separated by delimiters (/). The internal representation of a file is given by an inode, which contains a description of the disk layout of the file data and other information such as the file owner, access permissions, and access times. The term inode is a contraction of the term index node and is commonly used in literature on the UNIX system. Every file has one inode, but it may have several pathnames, all of which map into the inode. Each pathname is called a link. When a process refers to a file by pathname, the kernel parses the path name one file name component at a time, checks that the process has permission to search the directories in the path, and eventually retrieves the inode for the file. For example, if a process makes the call "open (/home/jqp)" the kernel retrieves the inode for "/home/jqp". As shown by 315 a "file system tree" for a full path name starts with a slash character ("/") and specifies that the path name is relative to the "root" of the file system tree. Following the branches that lead to successive component names of the path name "/home/jqp/memoirs" designates a full pathname while "home/memoirs" does not. A path name does not have to start from root but can be designated relative to the "current directory"

of an executing process by omitting the initial slash in the pathname. Thus, starting from current directory "/home", the path name "bin" designates the file whose file full pathname is "/home/bin".

When a process creates a new file, the file system driver 132 assigns it an unused inode. Inodes are stored in a section 223 of the physical file system 220, as will be described shortly, but the file system driver 132 reads them into an in-core-memory inode table when manipulating files. UNIX system typically keeps regular files and directories on block devices such as disks. An installation may have several physical disk units each containing one or more file systems. A file system 220 is organized as a sequence of logical blocks, each containing 512, 1024, 2048, or any convenient multiple of 512 bytes, depending on the system implementation. Multiples of 512 of 512 are used by convention and there is no intrinsic reason to use 512 byte blocks.

A physical file system may have the physical structure illustrated by 220 of FIG. 2. The boot block 221 (only on some file systems) occupies the beginning of a file system, typically the first sector, and may contain the bootstrap code that is read into the machine to boot, or initialize the operating system. Although only one boot block 221 is needed to boot the system, every file system may have a (possibly empty) boot block. The super block 222 describes the state of a file system—how large it is, how many files it can store, where to find free space on the file system, and other information. The inode list 223 is a list of inodes that follows the super block in the file system. Administrators specify the size of the inode list 223 when configuring a file system. The file system driver 132 references inodes by index into the inode list 223. One inode is the root inode of the file system: it is the inode by which the root directory structure of the file system is accessible after execution of the amount system call. The data blocks 224 start at the end of the inode list and hold the contents of data streams (i.e., file data). An allocated data block contains the actual data of a data stream of a file and can belong to one and only one file in the file system.

Figure 4:
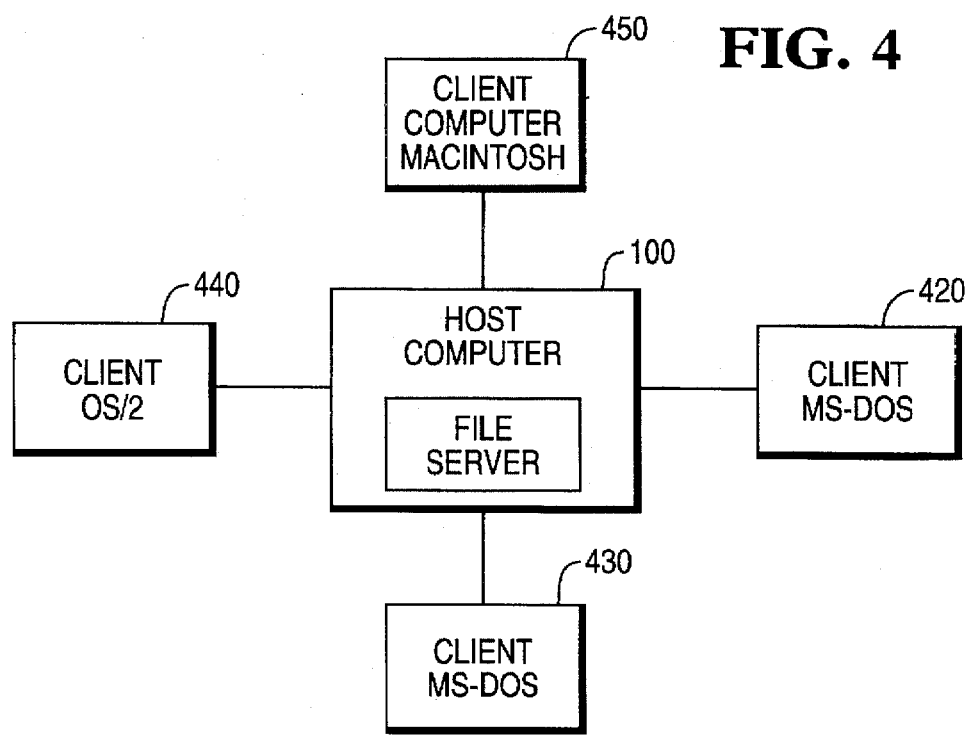
FIG. 4 shows a network having a host computer having a server coupled to multiple client computers running various operating systems.

In a preferred embodiment of the present invention, a host computer 100 of FIG. 1 which operates using the UNIX operating system is networked to a variety of other computers 420–450 running operating systems other than UNIX, for example, MS-DOS, as show in FIG. 4. Although the present invention is described with reference to the UNIX and MS-DOS operating systems, it will be understood that the method concepts disclosed may be equally applicable to other operating systems, such as OS/2 and Macintosh as would be realized by one skilled in the art.

In order that files may be referenced and accessed by computers (420,430,440,450) utilizing different operating systems, rather than maintaining an explicit namespace table, an algorithm is used to create legitimate, meaningful filenames by combining both a filename from a host computer's "native" name space and a unique "inode" number from the host computer's file system assigned for this file. The preliminary information necessary to apply the algorithm is able to be obtained rather easily, since the host computer's filename and inode number are returned by a well-known UNIX operating system call "getdents(2)". Client computers whose operating systems do not support a particular filename would both see and access a particular file via a special filename that is computed-on-the-fly, wherein this name is not actually stored on the host computer in either the file system or in a file, thereby eliminating a need for storing any additional information in the system. Using a unique file characteristic, or pseudo-unique characteristic, such as inode number for computing the mapping of a long filename, rather than the long filename alone, improves the uniqueness of resulting filenames, which is crucial if a client is dealing with large directories of files with similar names.

An exemplary algorithm for computing the unique filename is now presented. Consider a server computer running UNIX and a client computer running MS-DOS as shown in FIG. 4. IN the example, a shared file named "longfilename" has inode 1234 reported by the getdents(2) operating system call. The "longfilename", as is understood, is not a valid MS-DOS filename because it is not 8.3 format.

Figure 5:
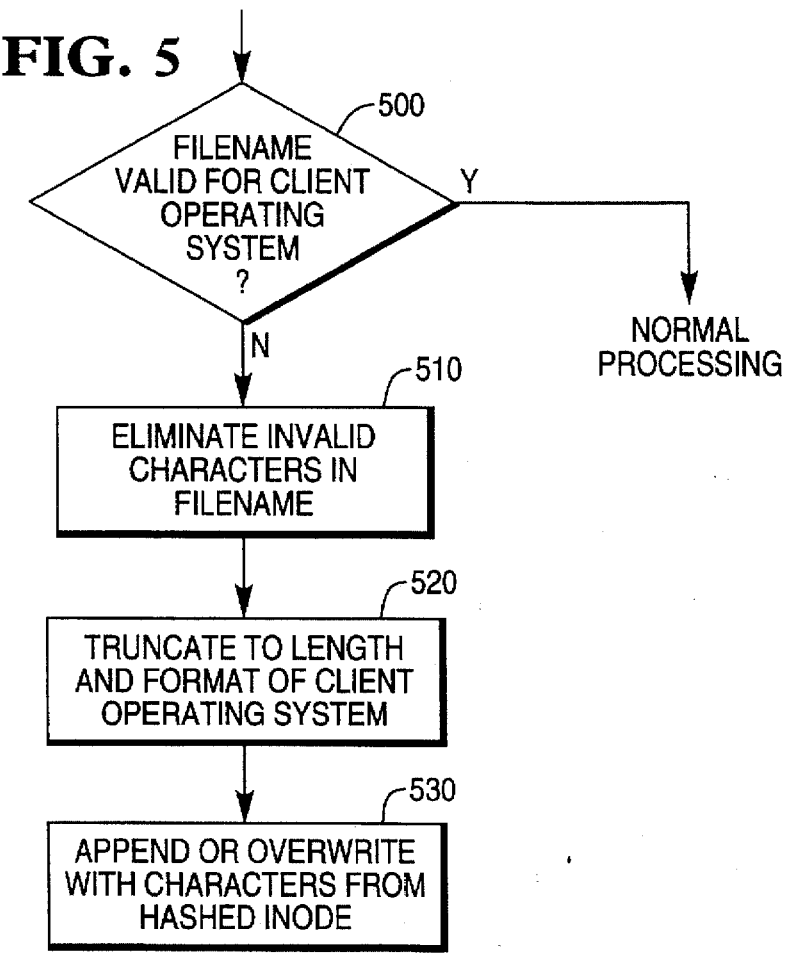
FIG. 5 shows a flow chart describing various operating features of the present invention.

A simple algorithm illustrated by way of a flow diagram is shown in FIG. 5. A first step 500 is to make a decision whether or not to implement the algorithm. That is, for example, a filename will be checked to determine if that filename is valid on a specific client operating system. If so, normal processing can be carried out; if not, the algorithm of the present invention will be implemented. A first step 510, after the filename has been provided, is to eliminate any characters from the native filename that are invalid on the client operating system. This name is then truncated to a length and format required by the client operating system. (520) Next, several characters are appended or overwritten if necessary with characters hashed from the inode number for the particular file. (530) A simple inode number hashing algorithm is to take a three digit decimal representation of the inode number modulus 1000. Thus, for the file "longfilename" with inode number 1234, the name would be filtered and truncated to "longfile". The hashed inode number is then "234" wherein the last three characters of "longfile" ("ile") are overwritten to reach a computed name of "longf234".

The "longfilename" file would be reported to MS-DOS clients, e.g. via MS-DOS's DIR command, via the computed name "longf234" and the computed name could be used in any MS-DOS command, for example "PRINT longf234". The file server program of the host computer implements the above-described change via modifications to the processing of two operations: reporting filenames and accessing filenames.

When reporting filenames to a client computer, the server scans the name of each file to determine if the name is valid for the client computer's operating system. If the name is valid, then the name is passed to the client via the normal file sharing mechanism. If the name is not valid for the client computer's operating system, then the server computes a name for that file according to the previously described algorithm that is both valid in the client computer's operating system and is (pseudo) unique in the directory.

When a client attempts to access a file on the server, the client passes the server a filename in the client operating system's naming convention. In the above example, the client passes the server the MS-DOS 8.3 filename. The server will attempt to find the file with this filename first. If such a named file does not exist, the server will assume that the filename is the result of a mapping of a long filename to 8.3 and attempt to find this long filename. The server will, for example, compute the mapping of each filename in the directory in which the given filename is expected to be found to the 8.3 format name using the above-described method. The filename received from the client is then compared to the resulting names. If a match is found, the long filename corresponding to the match is the name for which the client is searching. If no match is found, it is then presumed that the file does not exist in the system.

As discussed previously, the present invention may be applied to files accessed from clients running operating systems other than MS-DOS. This would be accomplished in a similar fashion using the described algorithm, as would be understood by a person skilled in the art.

It should also be understood that the present invention integrates an inode-related numeric value in order to increase the probability of uniqueness of the named file, however, this step is not necessarily required by the present invention. In another preferred embodiment of the present invention, illegal characters will be stripped from the host filename and truncated, if necessary. If required, an inode-related numeric value can then be incorporated. For example, the filename "file:2" would be considered illegal in an MS-DOS operating system environment because of the colon character. The present invention would eliminate the ":" (colon) character and cleanly convert this file to "file2", "file_2", or some other valid permutation in order that the filename be made legal on the host operating system.

Additionally, it will be understood that the present invention may also be utilized to interconnect computer devices which operate under different filenaming parameters, wherein the host operating system is more restrictive than the file system of the client device. For example, the present invention may be utilized when coupling Macintosh CD-ROM with an MS-DOS computer. (Recall that Macintosh filenames can be 31 characters long. Other similar applications of the present invention would include like combinations, such as, mounting UNIX CD-ROMs on MS-DOS computers, and Windows NT/Windows 95 and UNIX CD-ROMs on Macintosh systems. In these cases the client filenames would be modified so as to be usable on the operating system of the host device.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of computing a unique filename for files shared among users of a network, wherein said network includes a file server in a host computer running a host operating system and client computers which utilize a client operating system different from said host operating system, said method including the steps of:

providing a filename of a file from said file server, said filename being native to said host computer;

accessing an inode number assigned to said file by said file server of said host computer; and on-the-fly combining of said filename and said inode number to create said unique filename, wherein said unique filename is a valid filename for said client operating system, said unique filename operating as a name space mapping between said host computer and said client computers.

2. The method of claim 1, wherein said step of combining includes the steps of:

formatting said filename to eliminate any characters unacceptable to said client operating system; and truncating said filename to a length acceptable by said client operating system.

3. The method of claim 1, wherein said step of combining includes the step of:

appending, and overwriting if necessary, characters of said filename with a hashed inode number derived from said inode number.

4. The method of claim 3, wherein said hashed inode number is a three digit decimal representation of said inode number modulus 1000.

5. The method of claim 1, wherein said unique filename is computed on-the-fly by said file server during the reporting and accessing of files, thereby eliminating storage of static alternate filename references.

6. The method of claim 1, wherein said host operating system is UNIX.

7. The method of claim 6, wherein said filename and inode number are provided by a "getdents(2)" operating system call.

8. The method of claim 1, including the step of reporting filenames to a client computer, wherein said step of reporting includes the steps of:

scanning names of each file to be reported to determine if said name is valid for said client operating system;

passing said name to said client computer via a normal filesharing mechanism if said name is valid; and computing said unique filename for said name if said name is invalid on said client operating system.

9. The method of claim 1, further including the step of accessing a file at said client computer from said file server, wherein said step of accessing includes the steps of:

passing a name to said file server, said name being valid on said client operating system;

searching said file server to find a file having said name and returning said file if said name exists;

computing said unique filename for each filename in a directory specified from said client computer;

comparing said unique filename just computed for each said filename in said directory to ascertain a match with said name passed to said file server.

10. The method of claim 1, wherein said client operating system is MS-DOS.

11. A method of computing a valid filename for files shared among computer devices, wherein said devices include a host device running a host operating system and client device which may utilize a client operating system different from said host operating system, said method including the steps of:

providing a filename of a file from said host device, said filename being native to said host device;

formatting said filename to eliminate any characters unacceptable to said client operating system; and truncating, if necessary, said filename to a length acceptable by said client operating system, wherein said valid filename created is a valid filename for said client operating system.

12. The method of claim 11, further including the steps of:

accessing an inode number assigned to said file by said host device; and appending, and overwriting if necessary, characters of said filename with a hashed inode number derived from said inode number.

13. The method of claim 12, wherein said hashed inode number is a three digit decimal representation of said inode number modulus 1000.

14. The method of claim 12, wherein said unique filename is computed on-the-fly by said file server during the reporting and accessing of files, thereby eliminating storage of static alternate filename references.

15. A method of reporting filenames of files shared among users of a network, wherein said network includes a file server in a host computer running a host operating system and client computers which may utilize a client operating system different from said host operating system, said method including the steps of:

scanning names of each file to be reported to determine if said name is valid for said client operating system;

passing said name to said client computer via a normal filesharing mechanism if said name is valid; and computing a unique filename for said name if said name is invalid on said client operating system, wherein said step of computing includes the steps of, providing a filename of a file from said file server, said filename being native to said host computer;

accessing an inode number assigned to said file by said file server of said host computer; and combining said filename and said inode number to create said unique filename wherein said unique filename is a valid filename for said client operating system.

16. The method of claim 15, wherein said step of computing includes the steps of:

formatting said filename to eliminate any characters unacceptable to said client operating system;

truncating said filename to a length acceptable by said client operating system appending, and overwriting if necessary, characters of said filename with a hashed inode number derived from said inode number, wherein said unique filename created is a valid filename for said client operating system.

17. A method of accessing a shared file in a network at a client computer, wherein said network includes a file server in a host computer running a host operating system and client computers which may utilize a client operating system different from said host operating system, said method including the steps of:

passing a name to said file server, said name being valid on said client operating system;

searching said file server to find a file having said name and returning said file if said name exists;

computing a unique filename for each filename in a directory specified from said client computer, wherein said step of computing includes the steps of, providing a filename of a file from said file server, said filename being native to said host computer;

accessing an inode number assigned to said file by said file server of said host computer; and combining said filename and said inode number to create said unique filename, wherein said unique filename is a valid filename for said client operating system;

comparing said unique filename just computed for each said filename in said directory to ascertain a match with said name passed to said file server.

18. A file server apparatus for storing files shared among users of a network, wherein said network includes a host computer containing said file server and running a host operating system, and client computers which utilize a client operating system different from said host operating system, said apparatus comprising:

means for providing a filename of a file from said file server apparatus, said filename being native to said host computer;

means for accessing an inode number assigned to said file by said host computer; and means for on-the-fly combining said filename and said inode number to create a unique filename, wherein said unique filename is a valid filename for said client operating system, said unique filename operating as a name space mapping between said host computer and said client computers.

19. The apparatus of claim 18, further including:

means for formatting said filename to eliminate any characters unacceptable to said client operating system;

means for truncating said filename to a length acceptable by said client operating system; and means for appending, and overwriting if necessary, characters of said filename with a hashed inode number derived from said inode number.

20. The apparatus of claim 19, wherein said hashed inode number is a three digit decimal representation of said inode number modulus 1000.

21. The apparatus of claim 18, wherein said unique filename is computed on-the-fly by said file server during the reporting and accessing of files, thereby eliminating storage of static alternate filename references.

22. A method of computing a valid filename for files shared among computer devices, wherein said devices include a host device running a host operating system and client device utilizing a different and less restrictive file system than said host operating system, said method including the steps of:

providing a filename of a file from said client device, said filename being native to said client device;

formatting said filename to eliminate any characters unacceptable to said host operating system; and truncating, if necessary, said filename to a length acceptable by said host operating system, wherein said valid filename created is a valid filename for said host operating system.

23. The method of claim 22, further including the steps of:

accessing an inode number assigned to said file by said host device; and appending, and overwriting if necessary, characters of said filename with a hashed inode number derived from said inode number.

* * * * *